United States Patent Office 2,697,650
Patented Dec. 21, 1954

2,697,650

PROCESS FOR TREATING CHROMIUM AND VANADIUM BEARING MATERIAL

Arthur Norman Hixson, Moylan, and Russel J. Horst, Lebanon, Pa., assignors to Bethlehem Steel Company, a corporation of Pennsylvania No Drawing. Application November 19, 1952, Serial No. 321,513

4 Claims. (Cl. 23—18)

Our invention relates to the separation of vanadium from chromium, particularly the separation of vanadium from associations of chromium and vanadium where the ratios of the content of chromium to the quantity of vanadium is high.

Our invention comprises the steps of adding alkali metal hydroxide and lime to an aqueous solution of chromium and vanadium to precipitate vanadium without precipitating any substantial amount of chromium. Our invention comprises other features which will be evident from the succeeding description and claims.

In the specification we shall first illustrate the principles of our invention by means of a specific example, it being understood that this will be but an example and that it is not intended to have any limiting effect upon the claims. Our specific example of the invention involves the recovery of chromium and vanadium from Mayari ores. Mayari ores comprise iron as the principal metallic constituent. Besides iron these ores contain substantial amounts of silica and alumina and lesser amounts of compounds of nickel, cobalt, manganese, chromium and vanadium. Mayari ores as they occur in nature contain considerable "free water" and also substantial amounts of "combined water."

Analyses of Mayari ores when calcined vary considerably but in general they run within ranges approximately as follows:

| | | |
|---|---|---|
| Fe_____percent__ | 55 | |
| Ni_____do____ | 1.0 | 0.25 to 1.56 |
| Cr_____do____ | 2.2 | 2.1 to 2.3 |
| Co_____do____ | 0.15 | 0.05 to 0.35 |
| Mn_____do____ | 0.5 | 0.24 to 1.76 |
| $SiO_2$_____do____ | 5.0 | 1.6 to 7.0 |
| $Al_2O_3$_____do____ | 10.0 | 6.0 to 14.0 |
| V_____do____ | .030 | .012 to .047 |

In this table of analyses, the first column indicates the constituents of the ore; the second column indicates an average analysis; and the remainder of the table indicates the ranges.

In the example of our invention which we are here giving, the Mayari ore is roasted with sodium bicarbonate under oxidizing conditions, as by roasting in the presence of air, the sodium bicarbonate used being about ⅓ of the amount of ore being treated. The roasted ore is leached with water, the resulting solution containing most of the chromium and vanadium of the ore, the major part of the alumina and substantial amounts of the silica of the ore. Chromium is present in the solution as sodium chromate and the vanadium as sodium vanadate. The solution also contains considerable amounts of sodium hydroxide.

As the present invention is not concerned with the separation of the alumina and silica from the solution our description will be directed primarily to the treatment of the solution to remove at least part of the alkali and the separation of the vanadium from the chromium and to the recovery of vanadium pentoxide. In this alkali solution containing vanadium and chromium, prepared as above described, the chromium content is considerably greater than that of the vanadium.

This alkali solution is concentrated by evaporating part of the water. The concentrated solution is then carbonated by passing carbon dioxide through it to form sodium bicarbonate which is allowed to crystallize from the solution and removed therefrom by centrifuging. The solution is again subjected to concentration by evaporation followed by carbonation and crystallizing out further amounts of sodium bicarbonate. Preferably a third concentration is given the solution to recover further amounts of sodium bicarbonate by crystallization and to produce a relatively concentrated solution of the chromium and vanadium.

This solution contains chromium in the form of both the chromate of sodium and the bichromate. The vanadium is present as sodium vanadate. The chromium content of the solution is much greater than the vanadium content, as is to be expected from the much greater content of chromium in the ore. The pH of the solution is from 7 to 9. If this solution were to be treated with hydrated lime in the usual way not only would vanadium be precipitated but also a considerable quantity of the chromium. We have discovered that if an alkali metal hydroxide is added in sufficient quantity, in addition to the lime, the vanadium will be effectively precipitated without precipitating any substantial amount of chromium.

In the specific example of our invention, here given, a 50% solution of sodium hydroxide is added to the chromium and vanadium bearing solution following which lime is added to precipitate the vanadium as a compound of calcium and vanadium, this compound probably being a more or less complex calcium vanadate. The amount of sodium hydroxide solution to be added will vary with different conditions but it has been found in practice that the precipitation of any substantial amount of chromium is prevented if the sodium hydroxide is added in an amount sufficient to bring the pH of the solution to a figure from 10.5 to 11.5. The quantity of hydrated lime must be at least such as to satisfy the stoichiometric requirements of the vanadium but, in practice, a substantial excess of hydrated lime is employed. The separation of the vanadium from the solution by this treatment is very effective, practically all of the vanadium present in the solution being precipitated, leaving at most but a trace of vanadium in the solution and but a very small amount of the chromium being precipitated with the vanadium.

The chromium bearing solution, substantially free from vanadium, still contains considerable soda. It is next subjected to a series of treatments of concentration by evaporation, carbonation and crystallizing out of sodium bicarbonate to increase the concentration of the chromium content and to recover most of the sodium as sodium bicarbonate. These treatments by evaporation and carbonation are similar in nature to the evaporation and carbonation treatments given the solution before the separation of the vanadium. This treatment of the chromium bearing solution, following the separation of the vanadium changes the sodium chromate in the solution to sodium bichromate.

The precipitated calcium-vanadium compound is agitated with a solution of ammonium carbonate to dissolve the vanadium as ammonium vanadate, most of the calcium remaining undissolved as calcium carbonate. The solution is filtered to remove the calcium carbonate and the solution of ammonium vanadate containing an excess of ammonium carbonate is passed through a distilling tower in which it is subjected to steam to distill off ammonia, carbon dioxide and some water vapor which are used to reform ammonium carbonate for use in dissolving vanadium from subsequent amounts of calcium-vanadium precipitate.

The solution containing the vanadium is now acidified with sulphuric acid whereupon the vanadium is precipitated as vanadium pentoxide of a high degree of purity.

Having given a specific example of our process we shall now give indications of ways in which it may be modified while still utilizing the essential inventive thought.

It will be readily apparent that the process is applicable not only to Mayari ores and ores of the Mayari type but also to other ores containing chromium and vanadium, particularly to ores in which the ratio of chromium content to vanadium is high. In using the term "ores" it is not intended to limit the protection sought to ores in their natural state as the process is obviously applicable to ores which have been subjected to various beneficiating operations, such as roasting, for example.

In the specific example given above the ore is roasted with sodium bicarbonate. It is to be understood that either the bicarbonate, carbonate or hydroxide of an alkali metal may be used, or a mixture of these compounds. Where, in the claims, the expression "alkali metal carbonate" is used it is employed broadly to cover either the carbonate, bicarbonate or hydroxide, or mixtures thereof. Obviously, the amounts of alkali metal compounds to be used with the ore will vary somewhat according to the character of the ore being treated.

The steps of treatment to separate the vanadium from the chromium-vanadium solution as a precipitate of a compound of calcium and vanadium may be effected in various ways. In the specific example given above the solution, containing chromium and vanadium, is first treated with a solution of an alkali metal hydroxide and then with hydrated lime. The reverse order may be employed, i. e., the lime may be added first followed by the addition of the solution of alkali metal hydroxide. It is important in this latter case to add as much alkali metal hydroxide as in the former. When the alkali metal hydroxide is added before the lime the alkali is added until the solution has a pH of from 10.5 to 11.5. When the lime is added before the alkali one must first determine the amount of alkali metal hydroxide to add by testing a sample of the solution, with no lime added, to determine how much alkali metal hydroxide is required to bring the pH to a figure from 10.5 to 11.5.

In the specific example above given the calcium hydroxide is added in the dry form and we have found this a convenient way to add the calcium hydroxide. However, the effect of the hydroxide is the same if it is added as a slurry. While we have given calcium hydroxide as an example of the vanadium precipitating reagent we can use any alkaline earth hydroxide, although it is obvious that economically calcium hydroxide is far preferable.

In the specific example given above the solution is at or near the boiling point. We find the use of the high temperatures to be of considerable benefit in keeping the calcium low in the carbonate filtrate, i. e., the filtrate which is formed as a result of filtering the calcium-vanadium precipitate from the solution. However, high vanadium recoveries may be made when the solution is maintained at room temperatures by subjecting the solution, after the addition of the calcium hydroxide to aging. When using the aging treatment we have found 30 hours to be a satisfactory time.

In the steps of dissolving the vanadium from the calcium-vanadium precipitate we prefer the use of ammonium carbonate but we can obtain satisfactory results by using an alkali metal carbonate, as, for example, sodium carbonate.

We claim:

1. A process for treating ores containing chromium and vanadium, the chromium content of the ore considerably exceeding the vanadium content, comprising the steps of roasting the ore with an alkali metal hydroxide of the group consisting of alkali metal hydroxide, carbonate and bicarbonate, leaching the roasted ore with water to form an alkaline solution containing chromium and vanadium, the amount of chromium considerably exceeding the amount of vanadium, concentrating the solution by evaporating a part of the water, carbonating the concentrated solution to form alkali metal bicarbonate, crystallizing alkali bicarbonate from the solution, adding hydrated lime and an alkali metal hydroxide to precipitate a calcium-vanadium compound from the solution, the amount of alkali metal hydroxide added being sufficient to give the solution a pH of from 10.5 to 11.5 and the amount of hydrated lime being at least sufficient to combine with all the vanadium in the solution.

2. A process for the separation of vanadium from chromium in a solution containing these elements, the amount of chromium considerably exceeding the amount of vanadium, comprising the steps of adding an alkali metal hydroxide and calcium hydroxide to precipitate a calcium-vanadium compound from the solution, the amount of alkali metal hydroxide added being sufficient to give the solution a pH of from 10.5 to 11.5 and the amount of calcium hydroxide being at least sufficient to combine stoichiometrically with all of the vanadium in the solution.

3. A process for the separation of vanadium from chromium in a solution containing these elements, the amount of chromium considerably exceeding the amount of vanadium, comprising the steps of adding an alkali metal hydroxide to the solution in an amount sufficient to give the solution a pH of from 10.5 to 11.5 and then adding calcium hydroxide in excess of that necessary to combine with all the vanadium in the solution to precipitate the vanadium as a compound of calcium and vanadium.

4. A process for the separation of vanadium from a solution containing vanadium and chromium, the chromium content of the solution being considerably greater than the vanadium content, comprising the steps of testing a sample of the solution to determine the amount of alkali metal hydroxide necessary to be added to the solution to be treated to raise its pH to from 10.5 to 11.5, adding calcium hydroxide in excess to the solution to precipitate a calcium-vanadium compound and then adding alkali metal hydroxide to the solution in the amount previously determined by test to be necessary.

References Cited in the file of this patent

UNITED STATES PATENTS

| Number | Name | Date |
|---|---|---|
| 1,430,864 | Thews | Oct. 3, 1922 |
| 1,531,541 | Carpenter | Mar. 31, 1925 |
| 2,320,661 | Schneider | June 1, 1943 |
| 2,357,988 | Van Wirt | Sept. 12, 1944 |
| 2,576,445 | Cole et al. | Nov. 27, 1951 |
| 2,587,552 | Vedensky | Feb. 26, 1952 |